(12) United States Patent
De Jong

(10) Patent No.: US 6,883,716 B1
(45) Date of Patent: Apr. 26, 2005

(54) SECURE PHOTO CARRYING IDENTIFICATION DEVICE, AS WELL AS MEANS AND METHOD FOR AUTHENTICATING SUCH AN IDENTIFICATION DEVICE

(75) Inventor: Eduard Karel De Jong, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/148,830

(22) PCT Filed: Dec. 7, 1999

(86) PCT No.: PCT/NL99/00749

§ 371 (c)(1),
(2), (4) Date: Sep. 23, 2002

(87) PCT Pub. No.: WO01/43080

PCT Pub. Date: Jun. 14, 2001

(51) Int. Cl.⁷ .............................................. G06K 19/06
(52) U.S. Cl. ..................................................... 235/492
(58) Field of Search ................................ 235/492, 375, 235/380, 468, 487, 488; 430/10; 361/737; 283/77

(56) References Cited

U.S. PATENT DOCUMENTS

| 4,425,642 A | 1/1984 | Moses et al. |
| 4,921,278 A | 5/1990 | Shiang et al. ................. 283/87 |

(Continued)

FOREIGN PATENT DOCUMENTS

| DE | 4126213 | 2/1993 |
| DE | 4242247 A1 | 6/1994 |

(Continued)

OTHER PUBLICATIONS

Sun Microsystems, Inc., "Java Card™ 2.0 Application Programming Interfaces," Oct. 13, 1997, Revision 1.0 Final.

K. Matsui, et al., "Video–Steganography: How to Secretly Embed a Signature in a Picture", IMA Intellectual Property Project Proceedings, vol. 1, Issue 1, pp. 187–206, (Jan. 1994).

Chan, "Infrastructure of Multi–Application Smart Card," http://home.hkstar.com/~alanchan/papers/multiApplication-SmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

(Continued)

*Primary Examiner*—Thien M. Le
*Assistant Examiner*—Edwyn Labaze
(74) *Attorney, Agent, or Firm*—Finnegan, Henderson, Farabow, Garrett & Dunner, L.L.P.

(57) ABSTRACT

Means and a method for authenticating a photographic image (3) on an identification device (1), the identification device (1) being provided with: a photographic image of a person (3) and a microprocessor (8), the microprocessor (8) having: a) a processor (7), b) a memory (9) connected to the processor (7) and having stored authentication data, and c) interface means (5) connected to the processor (7) for communicating with an external device, wherein said photographic image (3) comprises steganographically hidden information, the content of which together with said authentication data allows authentication of said photographic image (3), the method having the following steps: a') scanning the photographic image (3) and generating image data, b') analyzing these image data in accordance with a predetermined image analysis procedure to derive said hidden information, and c') carrying out the authentication of the photographic image (3) based on the hidden information and the authentication data.

15 Claims, 3 Drawing Sheets

U.S. PATENT DOCUMENTS

| | | | |
|---|---|---|---|
| 4,930,129 A | | 5/1990 | Takahira |
| 4,953,160 A | | 8/1990 | Gupta |
| 5,057,997 A | | 10/1991 | Chang et al. |
| 5,148,546 A | | 9/1992 | Blodgett |
| 5,204,663 A | | 4/1993 | Lee |
| 5,204,897 A | | 4/1993 | Wyman |
| 5,283,885 A | | 2/1994 | Hollerbauer |
| 5,404,377 A | | 4/1995 | Moses |
| 5,446,901 A | | 8/1995 | Owicki et al. |
| 5,452,431 A | | 9/1995 | Bournas |
| 5,453,602 A | * | 9/1995 | Hanada ............... 235/439 |
| 5,469,559 A | | 11/1995 | Parks et al. |
| 5,481,715 A | | 1/1996 | Hamilton et al. |
| 5,534,372 A | * | 7/1996 | Koshizuka et al. ........ 430/10 |
| 5,544,246 A | | 8/1996 | Mandelbaum et al. |
| 5,594,227 A | | 1/1997 | Deo |
| 5,649,118 A | | 7/1997 | Carlisle et al. |
| 5,657,379 A | | 8/1997 | Honda et al. |
| 5,721,781 A | | 2/1998 | Deo et al. |
| 5,742,756 A | | 4/1998 | Dillaway et al. |
| 5,754,649 A | | 5/1998 | Ryan et al. |
| 5,768,385 A | | 6/1998 | Simon |
| 5,781,723 A | | 7/1998 | Yee et al. |
| 5,790,489 A | | 8/1998 | O'Connor |
| 5,802,519 A | | 9/1998 | De Jong |
| 5,832,119 A | | 11/1998 | Rhoads ............... 382/232 |
| 5,862,117 A | | 1/1999 | Fuentes et al. |
| 5,869,823 A | | 2/1999 | Bublitz et al. |
| 5,881,152 A | | 3/1999 | Moos |
| 5,884,316 A | | 3/1999 | Bernstein et al. |
| 5,889,868 A | | 3/1999 | Moskowitz et al. |
| 5,894,550 A | | 4/1999 | Thiriet |
| 5,896,393 A | | 4/1999 | Yard et al. |
| 5,905,798 A | | 5/1999 | Nerlikar et al. |
| 5,912,453 A | | 6/1999 | Gungl et al. |
| 5,915,027 A | | 6/1999 | Cox et al. |
| 5,930,363 A | | 7/1999 | Stanford et al. |
| 5,940,363 A | | 8/1999 | Ro et al. |
| 6,005,940 A | | 12/1999 | Kulinets |
| 6,052,690 A | | 4/2000 | De Jong |
| 6,094,656 A | | 7/2000 | De Jong |
| 6,168,207 B1 | | 1/2001 | Nishizawa |
| 6,173,391 B1 | | 1/2001 | Tabuchi et al. |
| 6,182,158 B1 | | 1/2001 | Kougiouris et al. |
| 6,212,633 B1 | | 4/2001 | Levy et al. |
| 6,220,510 B1 | | 4/2001 | Everett et al. |
| 6,241,153 B1 | * | 6/2001 | Tiffany, III ............... 235/488 |
| 6,250,555 B1 | * | 6/2001 | Inamoto ............... 235/487 |
| 6,257,486 B1 | * | 7/2001 | Teicher et al. ............. 235/380 |
| 6,292,874 B1 | | 9/2001 | Barnett |
| 6,310,956 B1 | | 10/2001 | Morito et al. |
| 6,349,336 B1 | | 2/2002 | Sit et al. |
| 6,546,112 B1 | * | 4/2003 | Rhoads ............... 382/100 |
| 6,572,025 B1 | * | 6/2003 | Nishikado et al. ......... 235/494 |

FOREIGN PATENT DOCUMENTS

| | | |
|---|---|---|
| DE | 19600081 | 7/1997 |
| EP | 0190733 | 8/1986 |
| EP | 0251861 A1 | 1/1988 |
| EP | 0466969 | 1/1992 |
| EP | 0 581 317 A2 | 2/1994 |
| EP | 0666550 | 8/1995 |
| EP | 0 674 295 A1 | 9/1995 |
| EP | 0723226 | 7/1996 |
| EP | 0849734 A2 | 6/1998 |
| EP | 0 864 996 A2 | 9/1998 |
| EP | 0 893 752 A1 | 1/1999 |
| EP | 0917152 A1 | 5/1999 |
| FR | 02776153 | 10/1998 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 6/1999 |
| JP | 200015886 | * 6/2000 | ......... G06K/19/10 |
| JP | 2001126046 | * 5/2001 | ......... G06K/19/10 |
| WO | WO 87/07062 | 11/1987 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/38162 | 7/1999 |

OTHER PUBLICATIONS

Daniels, John et al., "Strategies for Sharing Objects in Distributed Systems," JOOP, Object Designers Ltd., Uk., pp. 27–36.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997.

Islam, et al., "A Flexible Security Model for Using Internet Content," IBM Thomas J. Watson Research Center Papers, 'Online!', Jun. 28, 1997, from http://www.ibm.com/java/education/flexsecurity.

Lee, Chan Y., "Detecting Out–Of–Range References," http://127.0.0.1:8080/vtopic/isapi?action+View&VdkVgwKev=%2E@2E%2Fdata%2F1 993%2F, Jul. 24, 2002.

Philips Semiconductor, "Designers Offered First 16–Bit Smart Card IC Architecture with Development Tools," Press Release, Jul. 25, 2002.

Ritchey, Tim, "Advanced Topics: The Java Virtual Machine," Java!, Chapter 14, pp. ii–x and 325–346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

"Sun Microsystems Announces JAVACARD API," Business Wire, Oct. 1996.

Sun Microsystems, Inc., "Java Card Runtime Environment (JCRE) 2.1 Specification—Draft 2," Dec. 14, 1998.

"Java Card Applet Developer's Guide," Revision 1.12, Aug. 19, 1998, Sun Microsystems, Inc.

* cited by examiner

SECURE PHOTO CARRYING IDENTIFICATION DEVICE, AS WELL AS MEANS AND METHOD FOR AUTHENTICATING SUCH AN IDENTIFICATION DEVICE

FIELD OF THE INVENTION

The present invention relates to a photo carrying identification device, like passports, and (credit) cards used to identify persons, and thereafter authorize them to do a predetermined action, like entering a building, passing a boarder, carrying out an automatic debit transaction from an account, etc.

BACKGROUND OF THE INVENTION

The invention relates to the use of identification (ID) documents equipped with a picture of a document's holder, e.g., a driver's licence, or a plastic card having the size of a credit card, or a passport. In a common use of such an ID document, a human operator compares the picture on the document with the face of the document holder to assess entitlements sought by the document's holder based on credentials as defined by additional data in the document. A passport, for instance, gives access to a country based on nationality of the document's holder, A problem encountered with such documents is that they are frequently copied with false credentials or a false picture.

A common solution to this problem is the application of physical tamper detection methods such a sealing foil covering both the picture and the document, often combined with special inspection tools, like polarized light, to probe the tamper detection method. However, the use of such inspection tools often requires a skilled operator.

Another possible solution, referred to in paragraph [10002] of EP-B1-0,539,439, to tampering with the picture attached to the ID document is in using smart cards provided with a microprocessor having a processor and a memory. The memory in the card chip stores a digital copy of the picture on the card. A terminal is provided to read the content of the memory of the chip card and to display the stored image on a monitor to an operator. Then, the operator compares the displayed image on the monitor with the face of the actual card holder. This solution may even obviate the need to attach the picture on the card itself However, this solution requires costly display equipment which, amongst other reasons, has made this solution unsuitable in particular areas of industry which offers great potential to the use of smart cards, such as public transit systems where ID smart cards are sought as efficient improvement of traditional discount passes.

A further problem encountered in ID systems is in protecting the privacy of the individual using the ID document. Especially in case such an ID document is realized as an electronically readable smart card protection may be required from uncontrolled and/or unapproved collection of data identifying the individual and his or her use of the smart card.

To protect the privacy of the card holder, cryptographic techniques, e.g., blind signatures, may be applied to the process of reading ID and credential data from the smart card. However, the use of pictures stored in a card memory and read by a terminal for display on a monitor to an operator in principle defeats such cryptographic privacy protection. In such a case, the terminal is not only able to collect uniquely and strongly identifying data about individuals, i.e. their pictures, but also the nature of this data poses an additional threat in which, for instance, the individual may be compromised through digital image manipulation techniques. U.S. Pat. No. 5,748,763, column 58, line 24, to column 62, line 45, describes a method and an arrangement for enhancing the security of credit and debit cards. The arrangement disclosed has a computer arranged for receiving a digital image of the card holder. After having analyzed the digital image the computer generates a snowy image which is generally orthogonal to the digital image and adds this to the digital image to render an amended, unique image. The intended effect is to "texturize" the original digital image. It is not necessary that the snowy image itself is invisible to a person looking at the image. However, the image of the card holder may not be obscured by the snowy image. The amended, unique image is printed on the card. Moreover, the unique information is also stored in a central accounting network.

In a steganographic embodiment the snowy image is such that it is hidden in the photographic image of the person on the card. More detailed information as to steganography can be found in U.S. Pat. No. 5,613,004 and the references cited in this document. For the sake of the present invention steganography will be understood to relate to any method of obscuring information that is otherwise in plain sight. The information is hidden in another medium. It is used as an alternative to encryption. E.g., spreadsheets or graphics files could contain a text message invisible to an unaware person. People unaware of the hidden information will not recognize the presence of steganographically hidden information even if the information is in plain view.

In U.S. Pat. No. 5,748,763, referred to above, a scanner is provided to scan the card when the card holder wishes to use his card for a predetermined transaction, e.g., automatic payment from his account to pay for a product. The scanner is connected to the central accounting network. By means of a secure communication protocol the image of the card scanned by the scanner is transmitted to the central network. The central network is arranged to receive the transmitted information and to authenticate the validity of the image on the card.

Additional security to the known system may be provided by requesting the card holder to input a PIN during the scanning process. Moreover, additional security is provided by letting a third party, during the scanning process, check whether or not the person trying to carry out a transaction with the card is the person who's photo is on the card.

A disadvantage of the system and method disclosed by U.S. Pat. No. 5,748,763 is that it is only to operate when a central network is provided having stored all unique images of all participating cards.

SUMMARY OF THE INVENTION

A first object of the invention is to provide a photo carrying identification device that obviates the need for such a central network.

Therefore the invention provides an identification device provided with:
  a photographic image of a person and
  a microprocessor,
    the microprocessor comprising:
      a processor,
      a memory connected to the processor and comprising authentication data, and interface means connected to the processor for communicating with an external device;
wherein the photographic image comprises steganographically hidden information, the content of which together with the authentication data allows authentication of the photographic image.

Thus, the invention provides an identification device which are provided with a microprocessor, comprising the authentication data necessary to authenticate the photographic image on the identification device. In other words, the key to authenticate the photographic image is in the identification device itself instead of in a central network.

Such an identification device may be, for instance, a passport or a plastic identification card, like a smart card.

In one embodiment of the invention the processor is arranged to carry out at least part of the authentication. To that effect the processor will carry out a program preferably stored in the memory of the microprocessor.

The authentication data stored in the memory of the microprocessor may be a part of the photographic image on the identification device. However, it may also be data related to the photographic image. For instance, it may be related to grey level, intensity distribution, or image entropy of the photographic image.

A second object of the invention is to provide a terminal, which is arranged to communicate with the identification device of the invention to allow carrying out the authentication process required In a first embodiment the invention therefore provides a terminal arranged to communicate with an identification device, the identification device being provided with:
  a photographic image of a person and
  a microprocessor,
  the microprocessor comprising:
    a processor,
    a memory connected to the processor and comprising authentication data, and
    interface means connected to the processor for communicating with a terminal,
wherein the photographic image comprises steganographically hidden information, the content of which together with the authentication data allows authentication of the photographic image,
the terminal being provided with:
  a picture scanner to scan the photographic image and to generate image data,
  a terminal interface allowing communication with the processor of the identification device, and
  an image processor arranged
    to receive the image data,
    to analyze these image data in accordance with a predetermined image analysis procedure to derive the hidden information,
    to receive the authentication data from the memory, and
    to carry out at least part of the authentication of the photographic image based on the authentication data and the hidden information.

In this first embodiment, the authentication of the photographic image is either partly or entirely carried out by the image processor in the terminal.

The steps necessary to carry out said authentication will, in practice, be stored in a terminal memory. In an embodiment of the invention, the way in which these steps are carried out depends on the authentication data received from the memory of the identification device. In such an embodiment, the authentication carried out by the terminal will depend on data received from the identification device itself. This makes it impossible to predict the actual authentication steps carried out by the terminal, which enhances the security.

However, the security can also be enhanced in an alternative embodiment in which the processor of the identification device itself carries out at least part of the authentication of the photographic image. Therefore, the invention also provides a second embodiment of the terminal. This second embodiment terminal is arranged to communicate with an identification device, the identification device being provided with:
  a photographic image of a person and
  a microprocessor,
  the microprocessor comprising:
    a processor,
    a memory connected to the processor and comprising authentication data, and
    interface means connected to the processor for communicating with a terminal,
wherein the photographic image comprises steganographically hidden information, the content of which together with the authentication data allows authentication of the photographic image,
the processor being arranged to carry out at least part of the authentication of the photographic image,
the terminal being provided with:
  a picture scanner to scan the photographic image and to generate image data,
  a terminal interface allowing communication with the processor of the identification device, and
  an image processor arranged
    to receive the image data,
    to analyze these image data in accordance with a predetermined image analysis procedure to derive the hidden information, and
    to transmit at least the hidden information to the processor to allow the processor to carry out the at least part of the authentication of the photographic image.

Moreover, the invention relates to a method for authenticating a photographic image on an identification device, the identification device being provided with:
  a photographic image of a person and
  a microprocessor,
  the microprocessor comprising:
    a processor,
    a memory connected to the processor and comprising authentication data, and
    interface means connected to the processor for communicating with an external device,
wherein the photographic image comprises steganographically hidden information, the content of which together with the authentication data allows authentication of the photographic image,
the method comprising the following steps:
  scanning the photographic image and generating image data,
  analyzing these image data in accordance with a predetermined image analysis procedure to derive the hidden information, and
  carrying out the authentication of the photographic image based on the hidden information and the authentication data Finally, the invention relates to data carriers provided with a computer program and to computer programs as such for such a method.

Hereinafter, the present invention will be illustrated with reference to some drawings which are intended to illustrate the invention and not to limit its scope.

DETAILED DESCRIPTION OF THE EMBODIMENTS

Figure 1:
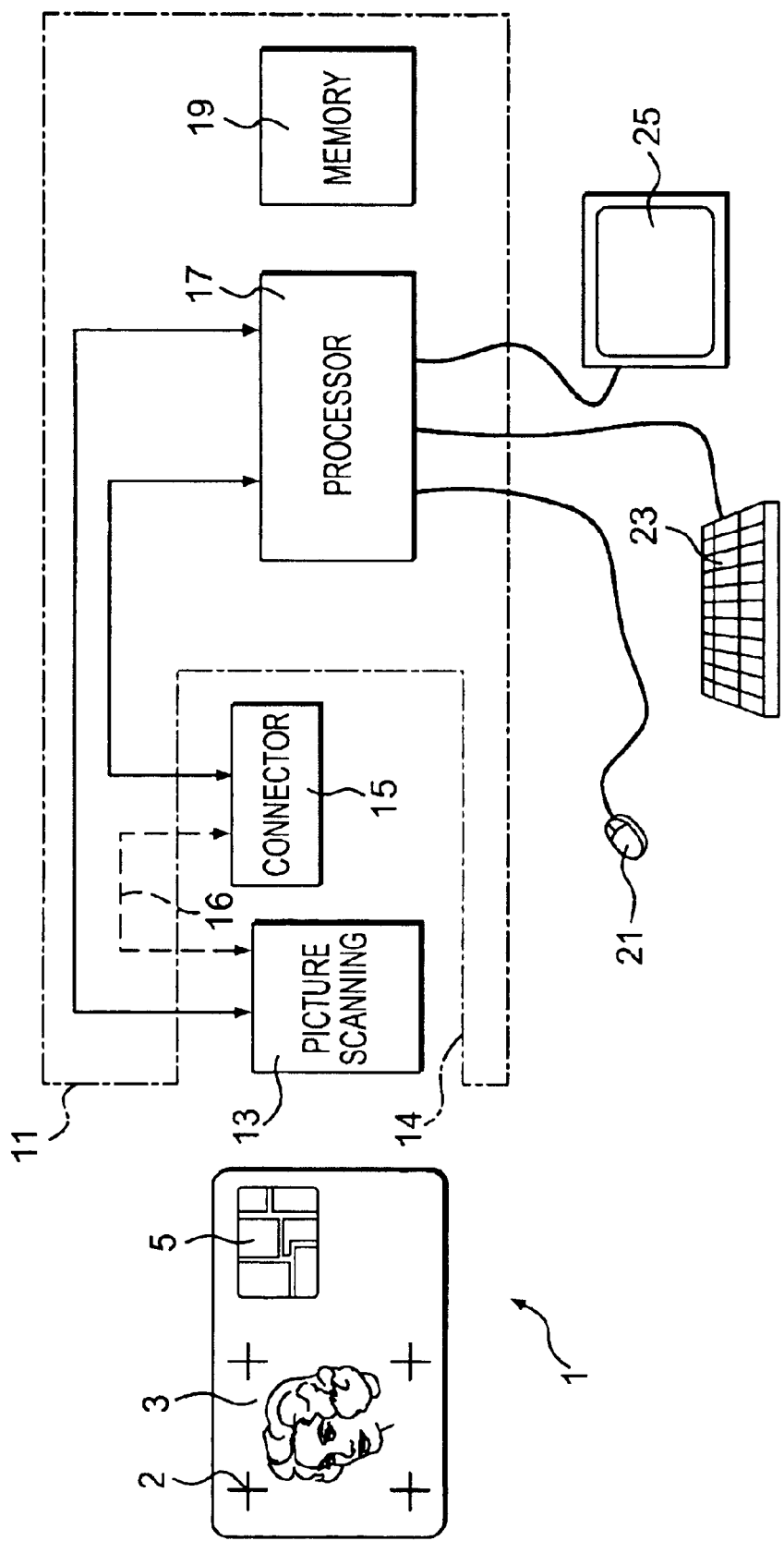
FIG. 1 is a schematic drawing of the system according to the invention showing a smart card and a terminal.

FIG. 1 shows a smart card 1 provided with a photographic image 3 of the card holder. The smart card 1 is provided with an interface 5 shown to be made of metallic pads. However, the interface 5 may have any other form, e.g., an antenna hidden within the smart card 1 allowing for contactless communication with an external device.

Figure 2:
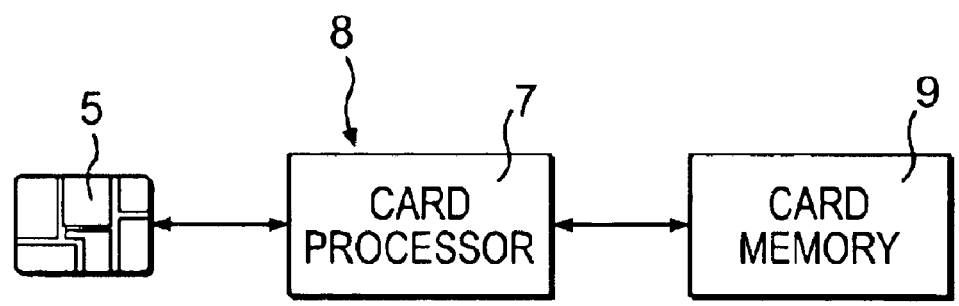
FIG. 2 shows the functional units of the microprocessor of the smart card in a schematic way.

As shown in FIG. 2, the interface 5 is connected to a card processor 7 which is also connected to a card memory 9.

Returning now to FIG. 1, the smart card 1 is, preferably, provided with one or more orientation signs 2 assisting a scanner during scanning the photographic image 3, as will be explained hereinafter.

It is observed that FIG. 1 shows a smart card 1 but that the invention is equally applicable for other types of documents having a photographic image of the document holder and a processor arranged to communicate with an external device.

The smart card 1 may be inserted into and removed from an opening 14 in a terminal 11. The terminal 11 is provided with a picture scanner 13 and a connector 15.

The picture scanner 13 is arranged such that it may scan the photographic image 3 either during insertion of the smart card 1 into the opening 14 or alter the smart card 1 has been inserted entirely in opening 14.

The connector 15 will contact the interface 5 of the smart card 1 when the smart card 1 has been inserted entirely in the opening 14. Of course, when interface 5 is designed in another form, e.g. an antenna, the connector 15 is to be replaced by another type of interface arranged to communicate with interface 5.

The picture scanner 13 is connected to a processor 17 which is also connected to the connector 15 and to a memory 19.

FIG. 1 also shows some input means, like a mouse 21, and a keyboard 23, allowing an operator to input data to the processor 17. A monitor 25 connected to the processor 17 is provided to allow the processor to display necessary information to the operator. Of course, any other kind of display means may be provided instead of or in addition to monitor 25.

In an alternative embodiment of the terminal shown in FIG. 1, the processor 17 is provided as a processing unit within the picture scanner 13. Then, the picture scanner 13 is directly connected to connector 15 (or any other interface) by a direct link indicated with reference sign 16.

Figure 3:
FIG. 3 schematically shows how information can be hidden in a photographic image.

FIG. 3 schematically shows that the photographic image 3 is provided with additional information 4. The additional information 4 is added to the photographic image 3 such that it is invisible to the human eye. Moreover, the additional information 4 may have such small dimensions that it is virtually impossible to be detected by automatic scanners if they do not know where to look for the additional information. The additional information 4 is added to the photographic image 3 by using steganographic techniques which are known to persons skilled in the art.

It is observed that, in FIG. 3, the additional information 4 is shown on such an enlarged scale that it is visible but in practice it will not be visible to the human eye. Moreover, in a preferred embodiment, the individual dots of information 4 are distributed over the entire image 3 to make it more difficult to find them.

The additional information 4 may have no relation at all to the content of the photographic image 3. However, the photographic image 3 before being printed on the smart card 1 may be preprocessed in such a way that the additional information 4 is calculated in dependence on the content of the photographic image 3 such that the degree to which it is hidden in the photographic image 3 is as best as possible.

In accordance with the present invention, the card memory 9 is provided with authentication data. The content of this authentication data, together with the hidden information 4 allows authentication of the photographic image 3.

In its simplest form, the authentication data has a one to one relation to the hidden information 4. However, the hidden information 4 may be present within the photographic image 3 in cryptographically processed form, e.g., it may be provided with a cryptographic signature such that the validity of the hidden information 4 can only be checked by an apparatus knowing the key to the cryptographic signature. Such a key is, then, stored in the card memory 9.

The hidden information 4 is such that it can be recognized by digitization of the photographic image 3 even if it is incomplete or otherwise impaired. The hidden information may have the form of a digital watermark.

Checking the validity of the hidden information may be based on any kind of calculation using both the hidden information 4 and the authentication data in the card memory 9.

Figure 4:
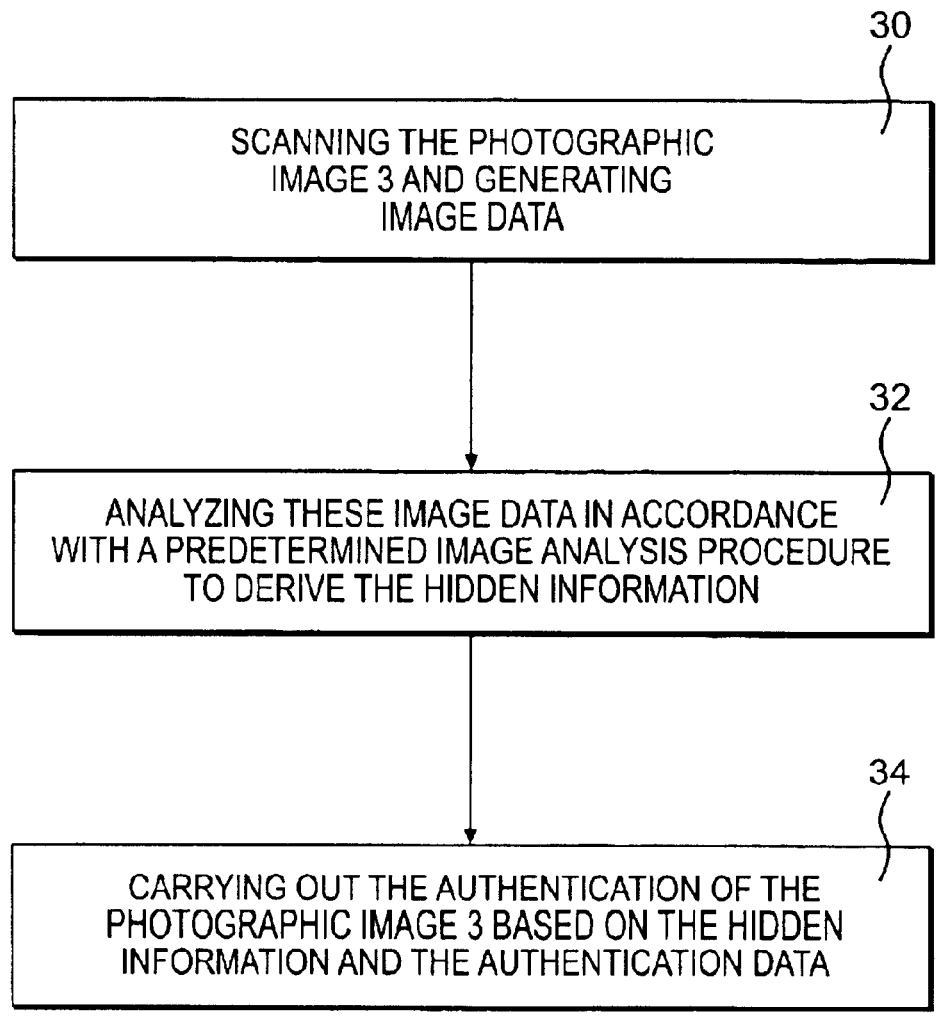
FIG. 4 shows a flow diagram of the method according to the invention.

As shown in FIG. 4, in order to allow for authentication, the card holder has to insert his or her smart card 1 into the opening 14 of the terminal 11. During insertion or after completing the insertion, the picture scanner 13 scans the photographic image 3, while interfaces 5 and 15 may communicate with one another. The orientation signs 2 may assist the picture scanner 13 in detecting where to search for the hidden information 4. The picture scanner 13 processes the photographic image 3 and generates image data which is sent to the processor 17, step 30.

The processor 17 digitally processes the received image data, as well as the authentication data stored in the card memory 9 in accordance with a predetermined program. In accordance with the predetermined program, which is preferably stored in memory 19, the processor 17 separates the hidden information 4 from the photographic image 3, step 32, and uses the hidden information 4 to establish the authenticity of the photographic image 3, step 34.

The authentication data received from the smart card 1 may be protected with any cryptographic means known to persons skilled in the art. Additionally, the data may be provided with a digital signature.

The authentication process carried out by the processor 17 may depend on the authentication data received from the smart card 1 in such a way that for different authentication data a different authentication process is carried out. This further enhances security.

In an alternative embodiment, instead of the processor 17 in the terminal 11, the card processor 7 is arranged to carry out the authentication process. To that end, it receives the hidden information 4 by means of the terminal 11.

However, since the card processor 7 and its memory 9 will only have a limited capacity, in practice, it will be preferred that both the processor 17 of the terminal 11 and the card processor 7 carry out part of the authentication process. The card processor 7 may, for instance, perform a final authentication step of the authentication process.

In a further embodiment the card memory 9 may be provided with credential data, i.e., data indicating predetermined actions the card holder is allowed to do, e.g., entering a building or an area, debiting an account, etc. In that case, the card processor 7 is, preferably, arranged to transmit these credential data to the processor 17 only when its own part of the authentication process has been carried out successfully. Thus, by receiving the credential data the processor 17 is informed that the authentication steps carried out by card processor 7 did not find any problems. When it does not receive the credential data the processor 17 knows that the authentication process has been unsuccessful.

To further enhance the security, the authentication data stored in card memory 9 may be related to one or more specific or general characteristics of the image 3 itself, like grey level, intensity distribution or image entropy. These parameters will be derived by the picture scanner 13 and transmitted to the processor 17. These parameters may be used by the processor 17 during the authentication process. However, in order to further enhance security, these parameters may be passed through the processor 17 to the card processor 7 which uses one or more of these parameters during carrying out its authentication steps.

Instead of the picture scanner 13 establishing the value of one or more of these parameters, these parameters may be digitally stored in the photographic image 3. The digitized value of these parameters may have been printed after being encoded. Before these digitized values of these parameters are added to the photographic image 3 they may be encoded.

In the embodiment described above, the terminal 11 is shown to include a memory 19. As is evident to persons skilled in the art memory 19 may comprise any kind of memory type like RAM, ROM, EPROM, EEPROM, etc. or any combination thereof. For the purpose of the present invention the memory 19 need not necessarily be physically located within the terminal 11.

Moreover, the processor 17 is shown to be one block. However, if preferred, the processor 17 may be implemented as several subprocessors communicating with one another each dedicated to perform a predetermined task. Preferably, the processor 17 is (or the subprocessors are) implemented as a computer with suitable software. However, if desired, they may be implemented as dedicated digital circuits.

The method in accordance with the present invention is preferably implemented by suitable software. This software may be distributed by data carriers like CDROM's or through the Internet or any other data communication medium.

What is claimed is:

1. An identification device comprising:
   a photographic image of a person; and
   a microprocessor,
   the microprocessor comprising:
      a processor,
      a memory connected to the processor and comprising authentication data, and
      interface means connected to said processor for communicating with an external device,
   wherein said photographic image comprises stenanographically hidden information, the content of which together with said authentication data allows authentication of said photographic image, wherein the microprocessor is arranged to carry out at least part of the authentication.

2. The identification device according to claim 1, wherein said memory includes credential data and the microprocessor is arranged to transmit the credential data to the external device only when the microprocessor has carried out at least part of the authentication successfully.

3. The identification device according to claim 1 or 2, wherein said processor is arranged to carry out at least part of said authentication.

4. The identification device according to claim 1 or 2, wherein said hidden information is provided with a cryptographic signature.

5. The identification device according to claim 1, wherein said authentication data is at least partly related to a feature of the photographic image.

6. The identification device according to claim 1, wherein said hidden information is related to a feature of the photographic image.

7. The identification device according to claim 5 or 6, wherein said feature is at least one of gray level, intensity distribution, and image entropy.

8. A terminal arranged to communicate with an identification device, said identification device comprising:
   a photographic image of a person; and
   a microprocessor,
   the microprocessor comprising:
      a processor,
      a memory connected to the processor and comprising authentication data, and
      interface means connected to said processor for communication with a terminal,
   wherein said photographic image comprises stenanographically hidden information, the content of which together with said authentication data allows authentication of said photographic image and the microprocessor is arranged to carry out at least part of the authentication of the photographic image,
   said terminal including:
      a picture scanner to scan the photographic image and to generate image data,
      a terminal interface allowing communication with said processor of the identification device, and
      an image processor arranged
         to receive said image data
         to analyze the image data in accordance with a predetermined image analysis procedure to derive said hidden information, and
         to transmit at least the hidden information to the processor to allow the processor to carry out the at least part of the authentication of the photographic image.

9. The terminal according to claim 8, wherein said authentication comprises a set of predetermined steps stored in a terminal memory, the way in which said steps are carried out depending on said authentication data received from said memory of said identification device.

10. A terminal according to claim 8, wherein the image processor is arranged to carry out a further part of the authentication of the photographic image only when it has received credential data from the microprocessor.

11. The terminal according to claim 8, 9, or 10, wherein said terminal has an opening for receiving said identification device, both said picture scanner and said terminal interface being located within said opening.

12. The terminal according to claim 8 or 10, wherein said image processor is integrated within said picture scanner.

13. A method for authenticating a photographic image on an identification device, said identification device comprising:
   a photographic image of a person; and
   a microprocessor,
   the microprocessor comprising:
      a processor,
      a memory connected to the processor and comprising authentication data, and
      interface means connected to said processor for communicating with an external device,
   wherein said photographic image comprises stenanographically hidden information, the content of which together with said authentication data allows authentication of said photographic image,
   said method comprising the following steps:
      scanning the photographic image and generating image data,
      analyzing the image data in accordance with a predetermined image analysis procedure to derive said hidden information, and
      carrying out said authentication of said photographic image based on said hidden information and said authentication data, wherein the microprocessor performs at least part of the authentication.

14. A data carrier provided with a computer readable program for a method for authenticating a photographic image on an identification device, said identification device comprising:
   a photographic image of a person; and
   a microprocessor,
   the microprocessor comprising:
      a processor,
      a memory connected to the processor and comprising authentication data, and
      interface means connected to said processor for communicating with an external device,
   wherein said photographic image comprises stenanographically hidden information, the content of which together with said authentication data allows authentication of said photographic image,
   said method comprising the following steps:
      scanning the photographic image and generating image data,
      analyzing the image data in accordance with a predetermined image analysis procedure to derive said hidden information, and
      carrying out said authentication of said photographic image based on said hidden information and said authentication data, wherein the microprocessor performs at least Dart of the authentication.

15. A computer program product for a method for authenticating a photographic image on an identification device, said identification device comprising:
   a photographic image of a person; and
   a microprocessor,
   the microprocessor comprising:
      a processors,
      a memory connected to the processor and comprising authentication data, and
      interface means connected to said processor for communicating with an external device,
   wherein said photographic image comprises stenanographically hidden information, the content of which together with said authentication data allows authentication of said photographic image,
   said method comprising the following steps:
      scanning the photographic image and generating image data,
      analyzing the image data in accordance with a predetermined image analysis procedure to derive said hidden information, and
      carrying out said authentication of said photographic image based on said hidden information and said authentication data, wherein the microprocessor performs at least part of the authentication.

* * * * *

UNITED STATES PATENT AND TRADEMARK OFFICE
CERTIFICATE OF CORRECTION

PATENT NO. : 6,883,716 B1
DATED : April 26, 2005
INVENTOR(S) : Eduard Karel De Jong It is certified that error appears in the above-identified patent and that said Letters Patent is hereby corrected as shown below:

Column 8,
Lines 7-8 and 43-44, "stenanographically" should read -- steganographically --.

Column 9,
Lines 23-24, "stenanographically" should read -- steganographically --.

Column 10,
Lines 3-4 and 31-32, "stenanographically" should read -- steganographically --.
Line 17, "Dart" should read -- part --.
Line 25, "a processors," should read -- a processor, --.

Signed and Sealed this

Twelfth Day of July, 2005

JON W. DUDAS
*Director of the United States Patent and Trademark Office*